United States Patent [19]

Reeder et al.

[11] Patent Number: 5,285,509
[45] Date of Patent: Feb. 8, 1994

[54] COUPLER FOR WAVEGUIDES OF DIFFERING CROSS SECTION

[75] Inventors: Robin A. Reeder, Hawthorne; Gregory R. Sasaki, Long Beach, both of Calif.

[73] Assignee: Hughes Aircraft Company, Los Angeles, Calif.

[21] Appl. No.: 992,399

[22] Filed: Dec. 18, 1992

[51] Int. Cl.$^5$ .............................................. G02B 6/32
[52] U.S. Cl. ...................................... 385/33; 385/43; 385/50; 385/133
[58] Field of Search ........................ 385/15, 31, 33, 39, 385/43, 50, 133, 146

[56] References Cited

U.S. PATENT DOCUMENTS 3,949,318  4/1976  Zeidler ............................. 385/33 X
4,128,302  12/1978  Di Vita ............................. 385/33
4,178,066  12/1979  Di Vita ............................. 385/33

*Primary Examiner*—John D. Lee
*Attorney, Agent, or Firm*—William J. Streeter; Wanda K. Denson-Low

[57] ABSTRACT

A waveguide coupler for coupling electromagnetic power between a first rectangular waveguide and a second rectangular waveguide includes a one-dimensional intermediate waveguide formed of two plates spaced apart by a distance equal to a common height of the two waveguides. This enables a wave emanating from the first waveguide to spread apart transversely so as to equal the width of the second waveguide, the width of the second waveguide being greater than the width of the first waveguide. A cylindrical lens is located between the intermediate waveguide and the second waveguide to provide for a conversion between a cylindrical wavefront and a planar wavefront. The coupler is operative in reciprocal fashion such that a wave emanating from the first waveguide spreads out in width and is then converted to a planar waveguide prior to entering the second waveguide; and a wave emanating from the second waveguide is converted to a wave of contracting width for entry into the first waveguide. In each of the first and the second waveguides, the waveguide has an open end which serves as a port by which electromagnetic power is coupled between the waveguide and the intermediate waveguide. In an alternative embodiment, the intermediate waveguide may be fabricated as a block of solid electromagnetic-wave propagating material.

10 Claims, 2 Drawing Sheets

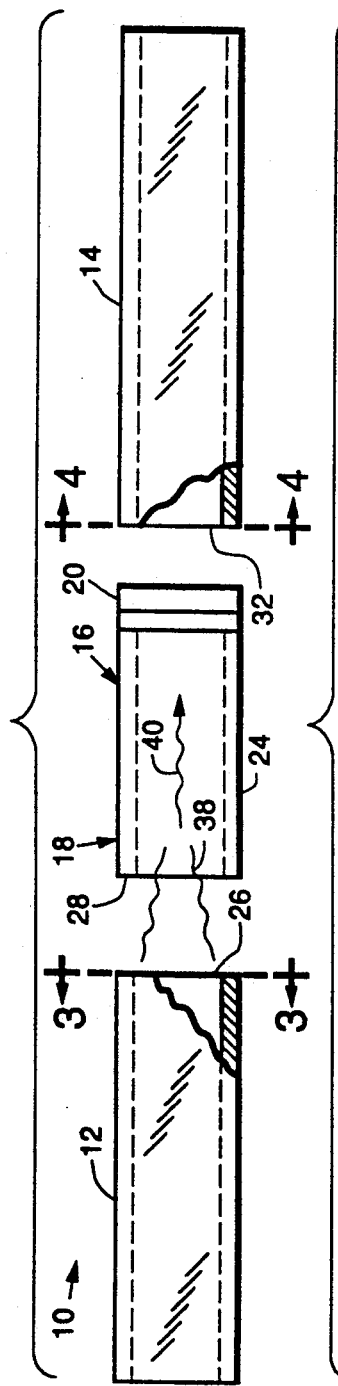
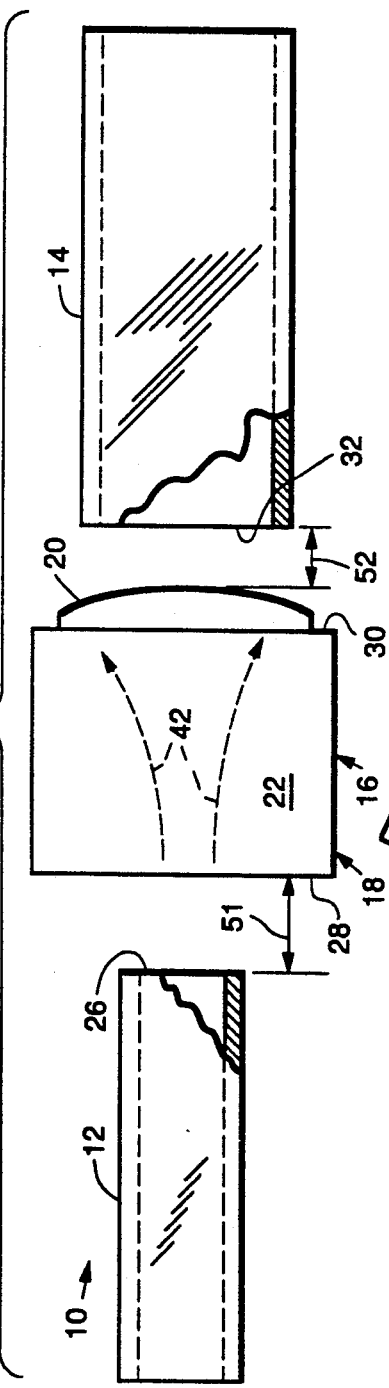
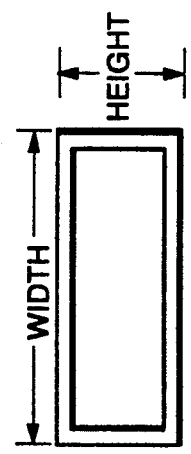
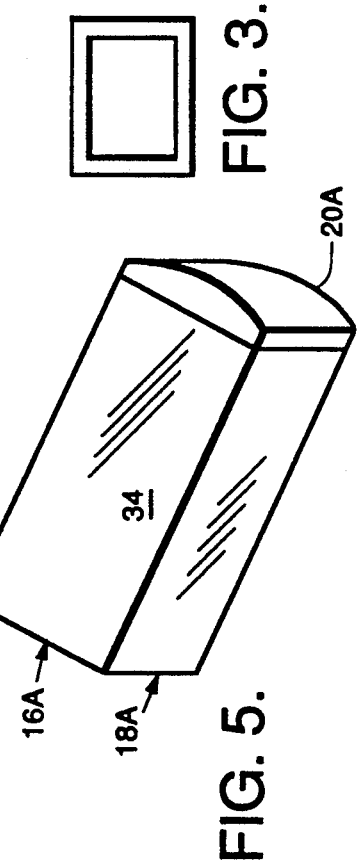
FIG. 1.
FIG. 2.
FIG. 3.
FIG. 4.
FIG. 5.

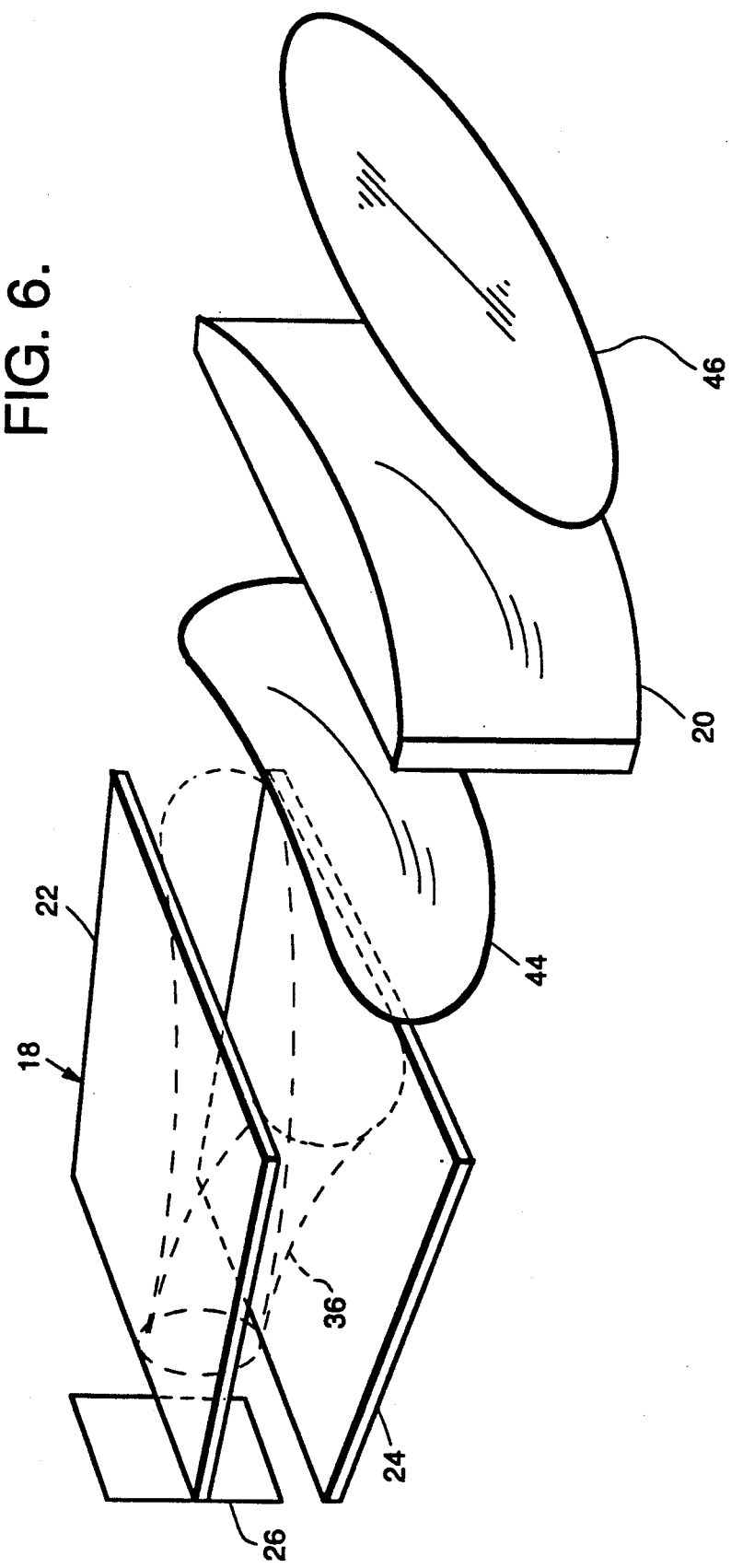

COUPLER FOR WAVEGUIDES OF DIFFERING CROSS SECTION

BACKGROUND OF THE INVENTION

This invention relates to the coupling of electromagnetic power, such as radiation of a laser, between two waveguides of different cross-sectional dimensions and, more particularly, to a coupler comprising a one-dimensional intermediate waveguide in conjunction with a cylindrical lens disposed between the intermediate waveguide and the larger of the two waveguides, the lens serving to provide a conversion between a cylindrical wavefront and a planar wavefront.

Optical signals may be transmitted by waveguides. By way of example, radiation from a carbon-dioxide laser having a wavelength of 10.6 microns may be transmitted by a waveguide, such as a rectangular waveguide measuring in the range of approximately two to four millimeters in cross-sectional dimension. In optical systems, the situation may arise wherein it is desired to couple radiant energy from a rectangular waveguide having a first set of cross-sectional dimensions to a second rectangular waveguide having a second set of cross-sectional dimensions different from the dimensions of the first waveguide. For example, it may be desired to couple output power of a carbon-dioxide laser, wherein the output radiation emanates from a square waveguide measuring two millimeters on a side, to a second waveguide of rectangular cross-section measuring two millimeters in height by four millimeters in width. This requires some form of optical coupling structure for converting the waveform of the square waveguide to a waveform suitable for the rectangular waveguide.

A problem arises in that existing coupling structures have excessive complexity, excessive difficulty in alignment, and excessive cost as compared to that which is desirable for providing a suitable waveguide coupler.

SUMMARY OF THE INVENTION

The aforementioned problem is overcome and other features are provided by a waveguide coupler, constructed in accordance with the invention, for coupling electromagnetic radiation, such as the infrared radiation of a carbon-dioxide laser, between waveguides of differing cross-sectional dimensions. In a preferred embodiment of the invention, the waveguide coupler is employed for coupling radiation between first rectangular waveguide and a second rectangular waveguide wherein each waveguide has an open end serving as a port through which radiant energy enters or exits the waveguide. The second waveguide, by way of example, has a height equal to that of the first waveguide and a width which is greater than that of the first waveguide. The coupler comprises an intermediate waveguide of one-dimensional configuration which is disposed between the ports of the first and the second waveguides, the coupler further comprising a cylindrical lens disposed between the intermediate waveguide and the waveguide of larger cross section, herein the second waveguide. The cylindrical lens serves to provide for a conversion between a cylindrical wavefront and a planar wavefront.

The waveguide coupler operates reciprocally so as to enable propagation of radiant energy from the waveguide of smaller cross-section to the waveguide of larger cross section, as well as from the waveguide of larger cross-section to the waveguide of smaller cross-section. In the former case, the first waveguide may output radiant energy of a laser oscillator to the second waveguide which includes a laser amplifier. In this case, an electromagnetic wave emanating from the first waveguide expands radially in one dimension and has a cylindrical wavefront. The cylindrical wavefront impinges upon the lens and is converted to a planar wavefront prior to entry into the second waveguide. In the second case, radiant energy exiting the second waveguide is converted by the cylindrical lens into a cylindrical wavefront which contracts in size with progression towards the first waveguide so as to have the requisite crosssectional dimensions for entering the first waveguide.

In the use of the coupler, it is noted that a fundamental mode of wave propagation can be described mathematically as a Gaussian beam wherein the width of the beam immediately adjacent the port of the first waveguide varies in cross-sectional dimension as a function of distance from the first waveguide. The intermediate waveguide is spaced apart from the first waveguide so that the edge of the intermediate waveguide is positioned at a location of the Gaussian beam having a cross-sectional width, or waist, which is approximately seventy percent of the height of the waveguide. This maximizes efficiency in the coupling of power via the waveguide coupler.

BRIEF DESCRIPTION OF THE DRAWING

The aforementioned aspects and other features of the invention are explained in the following description, taken in connection with the accompanying drawing wherein:

FIGS. 1 and 2 show stylized side-elevation and plan views, respectively, of waveguides of different cross-sectional dimensions coupled by a waveguide coupler of the invention;

FIGS. 3 and 4 show end views of smaller and larger cross-sectional waveguides, respectively, taken along the lines 3—3 and 4—4 in FIG. 1;

FIG. 5 is a perspective view of an alternative embodiment of the waveguide coupler; and FIG. 6 is a diagrammatic view of the coupler showing a beam and correction of its wavefront by a lens of the coupler.

DETAILED DESCRIPTION

With reference to FIGS. 1-4, an optical system 10 of the invention comprises a first waveguide 12 having a rectangular cross-section, a second waveguide 14 having a rectangular cross-section, and a waveguide coupler 16 which couples electromagnetic radiation from the first waveguide 12 to the second waveguide 14. The waveguide coupler 16 operates also in reciprocal fashion for coupling electromagnetic radiation from the second waveguide 14 to the first waveguide 12. However, for purposes of explaining the preferred embodiments of the invention, it is assumed, by way of example, that the electromagnetic radiation emanates in the first waveguide 12 and propagates via the waveguide coupler 16 to the second waveguide 14. By way of example, the first waveguide 12 may be regarded as an output portion of a laser oscillator, such as a carbon-dioxide oscillator operating to provide radiation with a wavelength of 10.6 microns, and the second waveguide 14 may be regarded as being an input section to a laser amplifier for amplifying the power of the radiation produced by the oscillator. To simplify the drawing, internal details in the construction of the oscillator and the amplifier are not shown in the drawing.

The waveguide coupler 16, in accordance with a first embodiment of the invention, comprises an intermediate waveguide 18 and a cylindrical lens 20. The intermediate waveguide 18 comprises a top plate 22, and a bottom plate 24 spaced apart from the top plate 22 and parallel to the top plate 22. The plates 22 and 24 may be fabricated of an electrically-conductive material or, alternatively, of a dielectric material such as a ceramic. By way of example, each of the plates 22 and 24 may be fabricated of copper. An output port 26 of the first waveguide 12 faces a front end 28 of the intermediate waveguide 18. The cylindrical lens 20 is located at a back end 30 of the intermediate waveguide 18, and faces an input port 32 of the second waveguide 14.

FIG. 5 shows an alternative embodiment of a waveguide coupler 16A comprising an intermediate waveguide 18A and a cylindrical lens 20A. The intermediate waveguide 18A is fabricated as a solid block 34 of the radiation-transmissive material. In the case of radiation falling within the visible portion of the electromagnetic spectrum, both the block 34 and the lens 20A may be fabricated of glass. However, in the case of the radiation produced by the carbon-dioxide laser having a wavelength of 10.6 microns, the block 34 and the lens 20A, as well as the lens 20 (FIGS. 1 and 2) may be fabricated of zinc selenide.

With reference to FIGS. 1–4 and FIG. 6, a beam of radiation emanating from the output port 26 of the first waveguide 12 has a cross-sectional width which tends to decrease in a region immediately adjacent the port 26 to a minimum value or waist and, thereafter, begins to expand in conical fashion as a fan beam 36 within the intermediate waveguide 18. The beam 36 is shown in FIG. 6, and the necking-down of the beam to a waist 38 is shown in FIG. 1, to the right of the port 26. It has been found, in the practice of the invention, that optimal coupling of electromagnetic power between the first and the second waveguides 12 and 14 is accomplished by positioning the front end 28 of the intermediate waveguide 18 at a position wherein the cross-sectional dimension of the beam, or waist, has decreased to a value approximately 70 percent of the height of the intermediate waveguide 18. The height dimension is the spacing between the top plate 22 and the bottom plate 24, the height of the intermediate waveguide 18 being equal also to the height of the first and the second waveguides 12 and 14. The width of the first and the second waveguide 12 and 14 is the cross-sectional distance between sidewalls of the waveguide, as is indicated in FIG. 4 for the input port 32 of the second waveguide 14.

In the case of the laser oscillator producing radiation with the wavelength at 10.6 microns, the first waveguide 12 has cross-sectional dimensions of two millimeters by two millimeters. This is indicated in FIG. 6. The spacing between the top and the bottom plates 22 and 24 is also equal to two millimeters. The spacing (indicated by S1 in FIG. 2) between the output port 26 and the front end 28 is approximately 1.5 inches, this spacing providing for a necking-down at the beam waist 38 of the aforementioned seventy percent of the height of the intermediate waveguide 18. Also, a spacing S2 is provided between the lens 20 and the input port 32 of the second waveguide 18 to optimize coupling of power between the first and the second waveguides 12 and 14. The spacing S2 has a value of approximately one inch in the preferred embodiment of the invention.

The propagation of the radiant energy is indicated by arrows 40 and 42 in FIGS. 1 and 2. The curved wavefront resulting from the conically expanding beam 36 is indicated at 44 in FIG. 6. The lens 20 corrects the phase of the curved wavefront 44 to produce a planar wavefront 46. As the fan beam 36 propagates, its wavefront becomes larger. Thus, by providing for increased length of the intermediate waveguide 18, a larger wavefront develops. In the case of the preferred embodiment of the invention, the width of the second waveguide 14, and of its input port 32 is equal to twice the corresponding width of the first waveguide 12 and its output port 26. However, the principles of the invention apply to even greater ratios of width, such as a width of three or four times that of the first waveguide 12, or even a non-integral ratio such as 1.5 or 2.5 times the width of the first waveguide 12. Virtually all of the power coupled out of the first waveguide 12 is provided by the $EH_{11}$ mode in the first waveguide 12. The intensity distribution of the radiation emanating from the first waveguide 12 is approximated mathematically quite accurately by a Gaussian distribution, as set forth in the following mathematical expressions.

In operation, the Gaussian beam is described by the following equations:

$$\omega = \omega_0 \sqrt{\left(1 + \frac{z^2}{z_0^2}\right)}$$

and $$R = z\left(1 + \frac{z_0^2}{z^2}\right)$$

where $$z_0 = \pi \omega_0^2 n/\lambda$$

and where $z_0$ is the confocal parameter, $\lambda$ is the wavelength of the radiation, n is the index of refraction of the medium of the intermediate waveguide (the air of the waveguide 18 or the zinc selenide of the waveguide 18A), $\omega$ is the half-width of the Gaussian beam at a distance z from the waist $\omega_0$, and R is the radius of curvature of the Gaussian wavefront 44 of FIG. 6. If it is desired to have a Gaussian beam waist that is M times larger than the initial waist, than the fan beam 36 is allowed to propagate until it has expanded by a factor of M, whereupon the curved wavefront is converted to the flat planar wavefront 46 by the lens 20. The propagation distance (L) within the intermediate waveguide 18 or 18A, and the focal length (f) of the lens 20 or 20A which accomplish the foregoing multiplicative factor M between the width of the second waveguide 14 and the width of the first waveguide 12 are given by the following equations:

$$L = z_0 \sqrt{(M^2 - 1)}$$

and

-continued $$f = z_0 \frac{M}{\sqrt{(M^2 - 1)}}$$

The waist (half width) of the Gaussian beam emanating from the first waveguide 12 is $$\omega_0 = 0.352h$$

where h is the height of the intermediate waveguide 18. In the foregoing example wherein the intermediate waveguide 18 has an air dielectric having an index of refraction of unity, and wherein the radiation is provided by the carbon-dioxide laser, the confocal parameter z0 has a value of 14.69 centimeters. Also, in the foregoing example, wherein the ratio of the widths of the second waveguide 14 to the first waveguide 12 is given by a factor, M, of 2, the propagation distance L has a value of 25.4 centimeters, and the focal length f of the lens 20 has a value of 33.9 centimeters.

By way of further example in the construction of the invention, it is noted that the preceding example has spacing values of S1 and S2 which have been selected to maximize the amount of power coupled between the first and the second waveguides 12 and 14. The amount of power actually coupled is in the range of 97–98 percent of the total power outputted by the first waveguide 12. However, it may be desired to maximize coupling from the fundamental mode of the radiation within the first waveguide 12 to the fundamental mode within the second waveguide 14. This has been accomplished by using an intermediate waveguide 18 having a length of 7.5 inches, a height of 2 millimeters, a spacing S1 of 2.5 inches from the first waveguide 12, and a spacing S2 of 1.5 inches from the second waveguide It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A waveguide coupler for coupling electromagnetic power between a first waveguide and a second waveguide, each of said waveguides having a rectangular cross-section and terminating in a rectangular port extending transversely to a longitudinal axis of the waveguide, the port of said first waveguide having a height equal to a height of the port of said second waveguide, the port of said second waveguide having a width larger than the width of the port of said first waveguide, said coupler comprising:
an intermediate waveguide disposed between the port of said first waveguide and the port of said second waveguide, said intermediate waveguide being configured as a one-dimensional waveguide and having opposed spaced-apart top and bottom surfaces; and
a cylindrical lens disposed between the port of said second waveguide and said intermediate waveguide to provide a wavefront conversion between a planar wavefront and a cylindrical wavefront;
wherein said intermediate waveguide is spaced apart from the port of said first waveguide by a distance wherein a cross-sectional width of a beam propagating through the port of said first waveguide is equal to approximately 70 percent of a height of said intermediate waveguide.

2. A coupler according to claim 1 wherein said top and said bottom surfaces are formed of plates, said plates comprising material which is electrically conductive.

3. A coupler according to claim 1 wherein said intermediate waveguide comprises a block of electromagnetic-wave propagating material extending from said top surface to said bottom surface.

4. A coupler according to claim 1 wherein the width of the port of said second waveguide is twice the width of the port of said first waveguide.

5. A coupler according to claim 1 wherein said top and said bottom surfaces are formed of plates, said plates comprising a dielectric material.

6. A coupler according to claim 1 wherein, in said intermediate waveguide, said top and said bottom surfaces have a spacing equal to the height of the port of said first waveguide.

7. A waveguide coupler for coupling electromagnetic power between a first waveguide and a second waveguide, each of said waveguides having a rectangular cross-section and terminating in a rectangular port extending transversely to a longitudinal axis of the waveguide, the port of said first waveguide having a height equal to a height of the port of said second waveguide, the port of said second waveguide having a width larger than the width of the port of said first waveguide, said coupler comprising:
an intermediate waveguide disposed between the port of said first waveguide and the port of said second waveguide, said intermediate waveguide being configured as a one-dimensional waveguide and having opposed spaced-apart top and bottom surfaces; and
a cylindrical lens disposed between the port of said second waveguide and said intermediate waveguide to provide a wavefront conversion between a planar wavefront and a cylindrical wavefront;
wherein a length (L) of said intermediate waveguide, as measured along an axis extending from said first waveguide to said second waveguide, has a length given approximately by the formula $$L = z_0 \sqrt{(M^2 - 1)}$$

wherein M is the ratio of the width of the port of said second waveguide divided by the width of the port of said first waveguide;
$Z_0$ is given approximately by the formula $$Z_0 \pi \omega^2{}_0 n/\lambda;$$

$\omega_0$ is the cross-sectional half-width of a beam of electromagnetic radiation measured at an edge at the intermediate waveguide facing said first waveguide, the beam propagating between said first waveguide and said intermediate waveguide;
n is an index of refraction of a radiation propagative medium of said intermediate waveguide; and
$\lambda$ is the wavelength of the radiation.

8. A waveguide coupler for coupling electromagnetic power between a first waveguide and a second waveguide, each of said waveguides having a rectangular cross-section and terminating in a rectangular port extending transversely to a longitudinal axis of the waveguide, the port of said first waveguide having a height equal to a height of the port of said second waveguide, the port of said second waveguide having a width larger than the width of the port of said first waveguide, said coupler comprising:

an intermediate wave disposed between the port of said first waveguide and the port of said second waveguide, said intermediate waveguide being configured as a one-dimensional waveguide and having opposed spaced-apart top and bottom surfaces; and a cylindrical lens disposed between the port of said second waveguide and said intermediate waveguide to provide a wavefront conversion between a planar wavefront and a cylindrical wavefront;

wherein a focal length (f) of said lens is given approximately by the formula $$f = z_0 \frac{M}{\sqrt{(M^2 - 1)}};$$

wherein M is the ratio of the width of the port of said second waveguide divided by the width of the port of said first waveguide;

$z_0$ is given by the formula $$z_0 = \pi \omega^2_0 n/\lambda;$$

$\omega_0$ is the cross-sectional half-width of a beam of electromagnetic radiation measured at an edge at the intermediate waveguide facing said first waveguide, the beam propagating between the first waveguide and the intermediate waveguide;

n is an index of refraction of a radiation propagative medium of said intermediate waveguide; and $\lambda$ is the wavelength of the radiation.

9. A coupler according to claim 8 wherein a length (L) of said intermediate waveguide, as measured along an axis extending from said first waveguide to said second waveguide, has a length given approximately by the $$L = z_0 \sqrt{(M^2 - 1)}$$

10. A coupler according to claim 9 wherein said intermediate waveguide is spaced apart from the port of said first waveguide by a distance wherein a cross-sectional width of the beam propagating through the port of said first waveguide is equal to approximately 70 percent of a height of said intermediate waveguide; and in said intermediate waveguide, said top and said bottom surfaces having a spacing equal to the height of the port of said first waveguide.

* * * * *